(12) United States Patent
Geaghan

(10) Patent No.: US 7,683,890 B2
(45) Date of Patent: Mar. 23, 2010

(54) TOUCH LOCATION DETERMINATION USING BENDING MODE SENSORS AND MULTIPLE DETECTION TECHNIQUES

(75) Inventor: Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 904 days.

(21) Appl. No.: 11/116,463

(22) Filed: Apr. 28, 2005

(65) Prior Publication Data

US 2006/0244732 A1 Nov. 2, 2006

(51) Int. Cl.
*G06F 3/041* (2006.01)
(52) U.S. Cl. .................................. 345/173; 178/18.01
(58) Field of Classification Search ......... 345/173–179; 178/18.01–18.11, 19.01–19.07
See application file for complete search history.

(56) References Cited

U.S. PATENT DOCUMENTS

| | | | |
|---|---|---|---|
| 3,857,022 A | 12/1974 | Rebane et al. | |
| 4,378,552 A | 3/1983 | Jalbert | |
| 5,231,381 A | 7/1993 | Duwaer | |
| 5,237,879 A | 8/1993 | Speeter | |
| 5,510,813 A | 4/1996 | Makinwa et al. | |
| 5,517,579 A | 5/1996 | Baron et al. | |
| 5,541,372 A | 7/1996 | Baller et al. | |
| 5,543,589 A | 8/1996 | Buchana et al. | |
| 5,563,632 A | 10/1996 | Roberts | |
| 5,635,643 A | 6/1997 | Maji | |
| 5,670,755 A | 9/1997 | Kown | |
| 5,691,959 A | 11/1997 | Kriewall et al. | |
| 5,717,432 A | 2/1998 | Miwa et al. | |
| 5,726,686 A | 3/1998 | Taniishi et al. | |
| 5,777,607 A | 7/1998 | Koolen | |
| 5,801,682 A | 9/1998 | Coni et al. | |
| 5,844,506 A | 12/1998 | Binstead | |
| 6,078,315 A | 6/2000 | Huang | |
| 6,138,512 A | 10/2000 | Roberts et al. | |
| 6,225,986 B1 | 5/2001 | Sato et al. | |
| 6,337,678 B1 * | 1/2002 | Fish ............................ 345/173 |
| 6,343,519 B1 | 2/2002 | Callicott et al. | |

(Continued)

FOREIGN PATENT DOCUMENTS

EP 0 589 498 3/1994

(Continued)

OTHER PUBLICATIONS

U.S. Appl. No. 11/025,389; Pechman et al.; filed Dec. 29, 2004; 25 pgs.

(Continued)

*Primary Examiner*—Kevin M Nguyen
*Assistant Examiner*—Kenneth B Lee, Jr.
(74) *Attorney, Agent, or Firm*—Steven A. Bern

(57) ABSTRACT

A touch sensing system and method uses bending mode sensors and a multiplicity of disparate touch location detection techniques to generate touch location information. A number of bending mode sensors are coupled to a touch sensitive surface. A number of disparate touch location detection techniques are provided, at least one of which uses signals generated by the bending mode sensors. Touch location information is developed using the disparate touch location detection techniques. The touch location information may include the location of a touch to the touch sensitive surface.

20 Claims, 7 Drawing Sheets

U.S. PATENT DOCUMENTS

| | | |
|---|---|---|
| 6,492,979 B1 | 12/2002 | Kent et al. |
| 6,504,530 B1 | 1/2003 | Wilson et al. |
| 6,680,677 B1 | 1/2004 | Tiphane |
| 6,690,618 B2 | 2/2004 | Tomasi et al. |
| 6,803,906 B1 | 10/2004 | Morrison et al. |
| 6,871,149 B2 | 3/2005 | Sullivan et al. |
| 7,157,649 B2 * | 1/2007 | Hill ................. 178/18.04 |
| 2001/0006006 A1 | 7/2001 | Hill |
| 2002/0135570 A1 | 9/2002 | Iisaka et al. |
| 2003/0038789 A1 * | 2/2003 | Nakazawa et al. .......... 345/173 |
| 2003/0217873 A1 | 11/2003 | Paradiso et al. |
| 2004/0233174 A1 | 11/2004 | Robrecht et al. |
| 2005/0078093 A1 | 4/2005 | Peterson, Jr. et al. |
| 2005/0134574 A1 | 6/2005 | Hill |
| 2005/0146511 A1 | 7/2005 | Hill et al. |
| 2005/0146512 A1 | 7/2005 | Hill et al. |
| 2005/0146513 A1 | 7/2005 | Hill et al. |
| 2005/0174338 A1 | 8/2005 | Ing et al. |
| 2006/0152499 A1 * | 7/2006 | Roberts ................. 345/173 |

FOREIGN PATENT DOCUMENTS

| | | |
|---|---|---|
| WO | WO 01/48684 | 7/2001 |
| WO | WO 03/005292 | 1/2003 |
| WO | WO 03/067511 | 8/2003 |

OTHER PUBLICATIONS

U.S. Appl. No. 11/032,572; Jerry B. Roberts; filed Jan. 10, 2005; 23 pgs.

* cited by examiner

TOUCH LOCATION DETERMINATION USING BENDING MODE SENSORS AND MULTIPLE DETECTION TECHNIQUES

FIELD OF THE INVENTION

The present invention relates to touch sensitive devices and, more particularly, to methods and systems using multiple touch location detection techniques, at least one of which uses signals generated by a bending mode sensors.

BACKGROUND

A touch sensitive device offers a simple, intuitive interface to a computer or other data processing device. Rather than using a keyboard to type in data, a user can transfer information by touching an icon or by writing or drawing on a touch sensitive panel. Touch panels are used in a variety of information processing applications. Interactive visual displays often include some form of touch sensitive panel. Integrating touch sensitive panels with visual displays is becoming more common with the emergence of next generation portable multimedia devices such as cell phones, personal data assistants (PDAs), and handheld or laptop computers. It is now common to see electronic displays in a wide variety of applications, such as teller machines, gaming machines, automotive navigation systems, restaurant management systems, grocery store checkout lines, gas pumps, information kiosks, and hand-held data organizers, to name a few.

Various methods have been used to determine the location of a touch on a touch sensitive panel. Touch location may be determined, for example, using a number of force sensors coupled to the touch panel. The force sensors generate an electrical signal that changes in response to a touch. The relative magnitudes of the signals generated by the force sensors may be used to determine the touch location.

Capacitive touch location techniques involve sensing a current change due to capacitive coupling created by a touch on the touch panel. A small amount of voltage is applied to a touch panel at several locations, for example, at each of the touch screen corners. A touch on the touch screen couples in a capacitance that alters the current that flows from each corner. The capacitive touch system measures the currents and determines the touch location based on the relative magnitudes of the currents.

Resistive touch panels are typically multilayer devices having a flexible top layer and a rigid bottom layer separated by spacers. A conductive material or conductive array is disposed on the opposing surfaces of the top and bottom layers. A touch flexes the top layer causes contact between the opposing conductive surfaces. The system determines the touch location based on the change in the touch panel resistance caused by the contact.

Touch location determination may rely on optical or acoustic signals. Infrared techniques used in touch panels typically utilize a specialized bezel that emits beams of infrared light along the horizontal and vertical axes. Sensors detect a touch that breaks the infrared beams.

Surface Acoustic Wave (SAW) touch location processes uses high frequency waves propagating on the surface of a glass screen. Attenuation of the waves resulting from contact of a finger with the glass screen surface is used to detect touch location. SAW typically employs a "time-of-flight" technique, where the time for the disturbance to reach the pickup sensors is used to detect the touch location. Such an approach is possible when the medium behaves in a non-dispersive manner, such that the velocity of the waves does not vary significantly over the frequency range of interest.

Bending wave touch technology senses vibrations created by a touch in the bulk material of the touch sensitive substrate. These vibrations are denoted bending waves any may be detected using sensors typically placed on the edges of the substrate. Signals generated by the sensors are analyzed to determine the touch location.

SUMMARY OF THE INVENTION

The present invention is directed to a touch sensing system and method that use bending mode sensors and a multiplicity of disparate touch location detection techniques to generate touch location information. According to one embodiment, a method involves providing a number of bending mode sensors coupled to a touch sensitive surface. A number of disparate touch location detection techniques are provided, at least one of which uses signals generated by the bending mode sensors. The method further involves developing touch location information using the disparate touch location detection techniques. The touch location information may include the location of a touch to the touch sensitive surface, for example.

In one approach, a first touch location detection technique provides a first degree of precision associated with a touch location determination, and a second touch location detection technique provides a second degree of precision associated with the touch location determination. In another approach, developing touch location information involves using the touch location information associated with a first touch location detection technique to enhance a touch location determination made by a second touch location detection technique. Typically, at least some of the disparate touch location detection techniques are capable of independently detecting a touch location.

According to a further approach, a first touch location detection technique determines x and y coordinates of a touch location relative to the touch sensitive surface. A second touch location detection technique determines a z coordinate relative to the touch sensitive surface.

In another approach, at least one touch location detection technique provides dispersion correction to the signals generated by at least one bending mode sensor. In another approach, developing the touch location information involves determining displacement of the touch sensitive surface using at least one of the touch location detection techniques. Developing the touch location information may involve determining a time of flight of bending waves generated by a touch on the touch sensitive surface using at least one of the touch location detection techniques. Developing the touch location information may further involve correcting for dispersion of the signals generated by at least one bending mode sensor. Developing the touch location information may also involve confirming a touch on the touch sensitive surface using a first touch detection technique, and determining a location of the touch on the touch sensitive surface using a second touch detection techniques.

In accordance with another embodiment, a touch sensitive device includes a number of touch sensors configured to detect bending of a touch sensitive surface resulting from a touch to the touch sensitive surface. The device further includes processing circuitry configured to implement a number of disparate touch location detection techniques. The touch location detection techniques are implemented to use signals generated by the touch sensors, and to develop touch location information using the disparate touch location detection techniques.

In one approach, at least one of the touch sensors is sensitive to a first frequency range and at least one other touch sensor is sensitive to a second frequency range that differs from the first frequency range. In another approach, at least one of the disparate touch location detection techniques is sensitive to a first frequency range and at least one other disparate touch location detection technique is sensitive to a second frequency range that differs from the first frequency range. In a further approach, the touch sensors are sensitive to the same frequency range.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
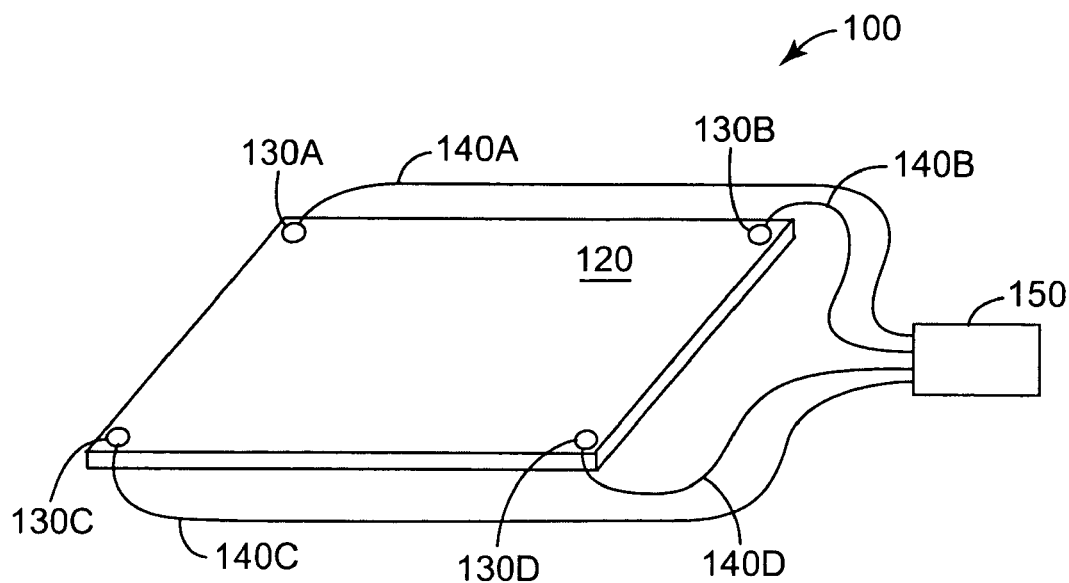
FIG. 1 is a block diagram showing a touch panel system that includes bending mode sensors and a controller configured to implement disparate touch location detection techniques in accordance with embodiments of the invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

The present invention relates to touch activated, user interactive devices and methods that provide for sensing of vibrations that propagate through a touch substrate for sensing by a number of touch transducers. More particularly, the present invention relates to touch sensing devices and methods that employ transducers configured to sense bending wave vibrations that propagate through a touch substrate, from which touch location information may be determined using disparate touch location detection techniques.

A touch sensing apparatus implemented in accordance with the present invention may incorporate one or more of the features, structures, methods, or combinations thereof described herein. It is intended that such a device or method need not include all of the features and functions described herein, but may be implemented to include selected features and functions that, in combination, provide for useful structures and/or functionality.

Embodiments of the invention are directed to combining a number of distinct touch location processes to determine the location of a touch on a touch panel. Some embodiments described herein involve the use of two or more touch location processes utilizing different types of touch location technology. Other embodiments involve the use of two or more touch location processes that use the same type of touch location technology, but use different methodologies for determining touch location.

Locating a touch to a touch substrate may involve determining the location of a static touch and/or determining the path of a dynamically moving touch, such as the motion used in a dragging, drawing or writing operation. Dynamic touch measurements may involve streaming data before, during and/or after touch down. Touch information may include position information for a touch on a plane surface, for example, the x and y coordinates of the touch position on a flat panel. Further, touch location determination may involve acquiring z-axis information. Z-axis touch information may include, for example, touch down and/or lift off detection, touch down and/or liftoff speed, distance above the touch panel and/or level of touch pressure on the touch panel. Touch information may also include information useful in discerning between intended and unintended touch events (e.g., false/true touch discrimination, hand rejection) and for implementing wake-on-touch functionality.

Noise in the touch signals may lead to inaccuracies in touch location determination. For example, noise may be caused by electrostatic discharge, electromagnetic interference, vibration, torsion, ambient light, noise from a display unit, acoustic noise, surface contamination, and/or other noise sources. Noise rejection may be an important factor for the touch location process. Some touch location processes have decreased sensitivity to noise from certain sources. In some embodiments, touch location processes may be combined to increase noise immunity.

Touch location processes are associated with various process parameters such as the accuracy of the touch location measurement, the resolution of the measurement, the speed at which the measurement may be acquired, and the resources consumed by the touch location process, for example, power or processor time consumed. A single touch location process may provide superior performance with respect to one of the above touch location parameters. However, a particular touch location process may not be optimal for measuring all touch parameters under all conditions.

A combination of touch location processes, as illustrated by embodiments of the invention described herein, may be advantageously used to yield superior performance with respect to one or more of the above parameters. Information from two or more touch location processes, for example, may be combined to enhance one or more of the above-mentioned process parameters or other process parameters. Combining the results of multiple independent processes for determining touch location provides a number of advantages over the use of a single process. A combination approach to touch location determination described herein may provide any or all of the following advantages: increased touch location accuracy, decreased complexity of touch location computations, increased speed in touch location determination, decreased power consumption, increased touch location sensitivity, increased immunity to noise and/or enhanced z-axis information, for example.

The term bending wave vibration refers to an excitation, for example by the contact, which imparts some out of plane displacement to a member capable to supporting bending wave vibrations. Many materials bend, some with pure bending with a perfect square root dispersion relation and some with a mixture of pure and shear bending. The dispersion relation describes the dependence of the in-plane velocity of the waves on the frequency of the waves. The term bending may also apply to out of plane displacement or deflection of a member when subject to loading, such as when a touch panel deflects (e.g., is subject to bowing) in response to a touch applied to the surface of the touch panel. In this regard, one surface of the touch panel is placed in compression, while the opposing surface is placed in tension, which results in bowing of the touch panel. Such bowing of the touch panel may be detected using bending mode sensors of a type described herein and in a manner discussed hereinbelow.

In vibration sensing touch input devices that include piezoelectric sensors, for example, vibrations propagating in the plane of the touch panel plate stress the piezoelectric sensors, causing a detectable voltage across the sensor. The signal received can be caused by a vibration resulting directly from the impact of a direct touch input or the input of energy due to a trace (friction), or by a touch input influencing an existing vibration, for example by attenuation of the vibration. The signal received can also be caused by an unintended input, such as an input resulting from user handling or mishandling of the touch input device, or from environmental sources external to, but sensed by, the touch input device.

Turning now to FIG. 1, there is illustrated one configuration of a touch sensitive device 100 that incorporates features and functionality for detecting bending wave vibrations and determining touch location using a multiplicity of disparate touch location detection techniques. According to this embodiment, the touch sensitive device 100 includes a touch substrate 120 and vibration sensors 130 coupled to an upper surface of the touch substrate 120. In this illustrative example, the upper surface of the touch substrate 120 defines a touch sensitive surface. Although sensors 130 are shown coupled to the upper surface of the touch substrate 120, the sensors 130 can alternatively be coupled to the lower surface of the touch substrate 120. In another embodiment, one or more sensors 130 may be coupled to the upper surface while one or more other sensors 130 may be coupled to the lower surface of the touch substrate 120. The vibration sensors 130A-130D can be coupled to touch plate 120 by any suitable means, for example using an adhesive, solder, or other suitable material, so long as the mechanical coupling achieved is sufficient for vibrations propagating in the touch plate can be detected by the vibration sensors. Exemplary vibration sensors and vibration sensor arrangements are disclosed in co-assigned U.S. patent application U.S. Ser. No. 10/440,650 and U.S. Ser. No. 10/739,471, which are fully incorporated herein by reference into this document.

Touch substrate 120 may be any substrate that supports vibrations of interest, such as bending wave vibrations. Exemplary substrates 120 include plastics such as acrylics or polycarbonates, glass, or other suitable materials. Touch substrate 120 can be transparent or opaque, and can optionally include or incorporate other layers or support additional functionalities. For example, touch substrate 120 can provide scratch resistance, smudge resistance, glare reduction, anti-reflection properties, light control for directionality or privacy, filtering, polarization, optical compensation, frictional texturing, coloration, graphical images, and the like.

In general, the touch sensitive device 100 includes at least three sensors 130 to determine the position of a touch input in two dimensions, and four sensors 130 (shown as sensors 130A, 130B, 130C, and 130D in FIG. 1) may be desirable in some embodiments, as discussed in International Publications WO 2003/005292 and WO 01/48684, and in co-assigned U.S. patent application Ser. No. 09/746,405, which is fully incorporated herein by reference into this document.

In the present invention, sensors 130 are preferably piezoelectric sensors that can sense vibrations indicative of a touch input to touch substrate 120. Useful piezoelectric sensors include unimorph and bimorph piezoelectric sensors. Piezoelectric sensors offer a number of advantageous features, including, for example, good sensitivity, relative low cost, adequate robustness, potentially small form factor, adequate stability, and linearity of response. Other sensors that can be used in vibration sensing touch sensitive devices 100 include electrostrictive, magnetostrictive, piezoresistive, acoustic, capacitive, and moving coil transducers/devices, among others.

In one embodiment, all of the sensors 130 are configured to sense vibrations in the touch substrate 120. The sensors 130 may be substantially the same in terms of technology and functionality. For example, all of the sensors 130 may be bending mode sensors produced by a particular manufacturer under the same part number or identification. In other embodiments, the sensors 130 may be substantially the same in terms of technology, but differ in terms of functionality. For example, all of the sensors 130 may be bending mode sensors produced by a particular manufacturer, with some of these sensors implemented to detect bending waves and other sensors implemented to detect plate deflection. In some embodiments, one or more of the sensors 130 may be a sensor other than a bending mode sensor.

In accordance with another embodiment, one or more of the sensors 130 can be used as an emitter device to emit a signal that can be sensed by the other sensors 130 to be used as a reference signal or to create vibrations that can be altered under a touch input, such altered vibrations being sensed by the sensors 130 to determine the position of the touch. An electrodynamic transducer may be used as a suitable emitter device. Moreover, one or more of the sensors 130 can be configured as a dual purpose sense and excitation transducer, for example as disclosed in previously incorporated International Publications WO 2003/005292 and WO 01/48684 as well as co-assigned U.S. patent application Ser. No. 10/750,502, which is fully incorporated herein by reference into this document.

Many applications that employ touch sensitive devices 100 also use electronic displays to display information through the touch sensitive devices 100. Since displays are typically rectangular, it is typical and convenient to use rectangular touch sensitive devices 100. As such, the touch substrate 120 to which the sensors 130 are affixed is typically rectangular in shape, it being understood that other geometries may be desirable.

According to one configuration, the sensors 130A, 130B, 130C, 130D are preferably placed near the corners of the touch substrate 120. Because many applications call for a display to be viewed through the touch sensitive devices 100, it is desirable to place the sensors 130A-D near the edges of the touch substrate 120 so that they do not undesirably encroach on the viewable display area. Placement of the sensors 130A-D at the corners of a touch substrate 120 can also reduce the influence of acoustic reflections from the panel edges.

The contact sensed by the touch sensitive device 100 may be in the form of a touch from a stylus, which may be in the form of a hand-held pen. The movement of a stylus on the touch substrate 120 may generate a continuous signal, which is affected by the location, pressure and speed of the stylus on the touch substrate 120. The stylus may have a flexible tip, e.g. of rubber, which generates bending waves in the touch substrate 120 by applying a variable force thereto. The variable force may be provided by the tip, which alternatively adheres to or slips across a surface of the touch substrate 120. Alternatively, the contact may be in the form of a touch from a finger that may generate bending waves in the touch substrate 120, which may be detected by passive and/or active sensing. The bending waves may have frequency components in the ultrasonic region (>20 kHz).

The touch sensitive device 100 shown in FIG. 1 is communicatively coupled to a controller 150. The sensors 130A-D are electrically coupled to the controller 150 via wires 140A-D or a printed electrode pattern developed on the touch substrate 120. The controller 150 typically includes front end electronics that applies signals to the sensors 130 and measures signals or signal changes. In other configurations, the controller 150 may further include a microprocessor in addition to front end electronics. The controller 150, as is described in detail below, is capable of implementing one or more touch location detection techniques selected from a library of disparate touch location detection techniques. Selection of the various touch location detection techniques may be made based on criteria discussed above, and such selection may be modified in response to changes in touch stimuli characteristics, operating conditions, environmental conditions, and the like.

In a typical deployment configuration, the touch sensitive device 100 is used in combination with a display of a host computing system (not shown) to provide for visual and tactile interaction between a user and the host computing system. The host computing system may include a communications interface, such as a network interface, to facilitate communications between a touch panel system that incorporates touch sensitive device 100 and a remote system. Various touch panel system diagnostics, calibration, and maintenance routines, for example, may be implemented by cooperative communication between the touch panel system and the remote system.

Figure 2:
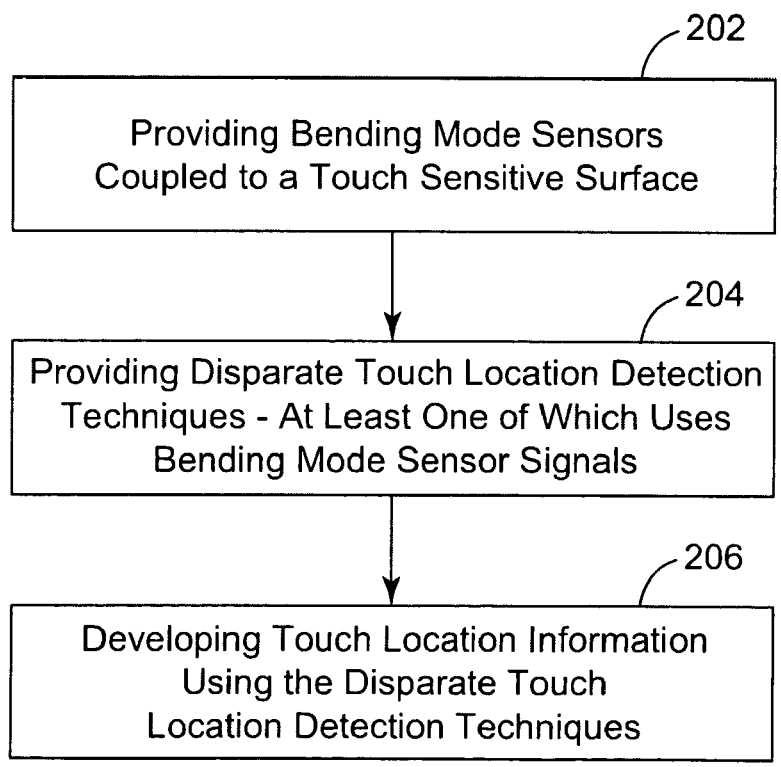
FIGS. 2-4 are flowcharts illustrating several methods of developing or enhancing touch location information using bending mode sensor signals and disparate touch location detection techniques in accordance with embodiments of the invention.

FIG. 2 is a flowchart illustrating a method of developing touch location information using bending mode sensor signals and disparate touch location detection techniques in accordance with embodiments of the invention. The methodology illustrated in FIG. 2 involves providing 202 bending mode sensors that are coupled to a touch sensitive surface. A multiplicity of disparate touch location detection techniques are provided 204. At least one of these techniques uses bending mode sensor signals. Touch location information is developed 206 using the disparate touch location detection techniques.

Developing the touch location may involve determining the location of the touch on the touch sensitive surface. At least some of the disparate touch location detection techniques are capable of independently detecting a touch location. For example, a first touch location detection technique may determine x and y coordinates of a touch location relative to the touch sensitive surface, and a second touch location detection technique may determine a z coordinate relative to the touch sensitive surface.

The touch location information may include information that facilitates calibration of the touch panel system or is useful when performing system diagnostics or maintenance. In some embodiments, at least two differing touch location detection techniques are provided that use signals generated by the bending mode sensors. For example, two or more touch location detection techniques may use signals generated by the bending mode sensors, but differ from one another in terms of frequency response or other characteristic, such as accuracy of the touch location measurement, resolution of the measurement, speed at which the measurement may be acquired, and resources consumed by the touch location process.

By way of further example, two or more touch location detection techniques may differ from one another in terms of the manner by which each processes bending mode sensor signals to produce touch location information. In one embodiment, a particular touch location detection technique may operate on bending wave signals in two or more distinct ways to produce touch location information. In another embodiment, two or more distinct touch location detection techniques may operate on bending wave signals in substantially the same way to produce touch location information.

Figure 3:
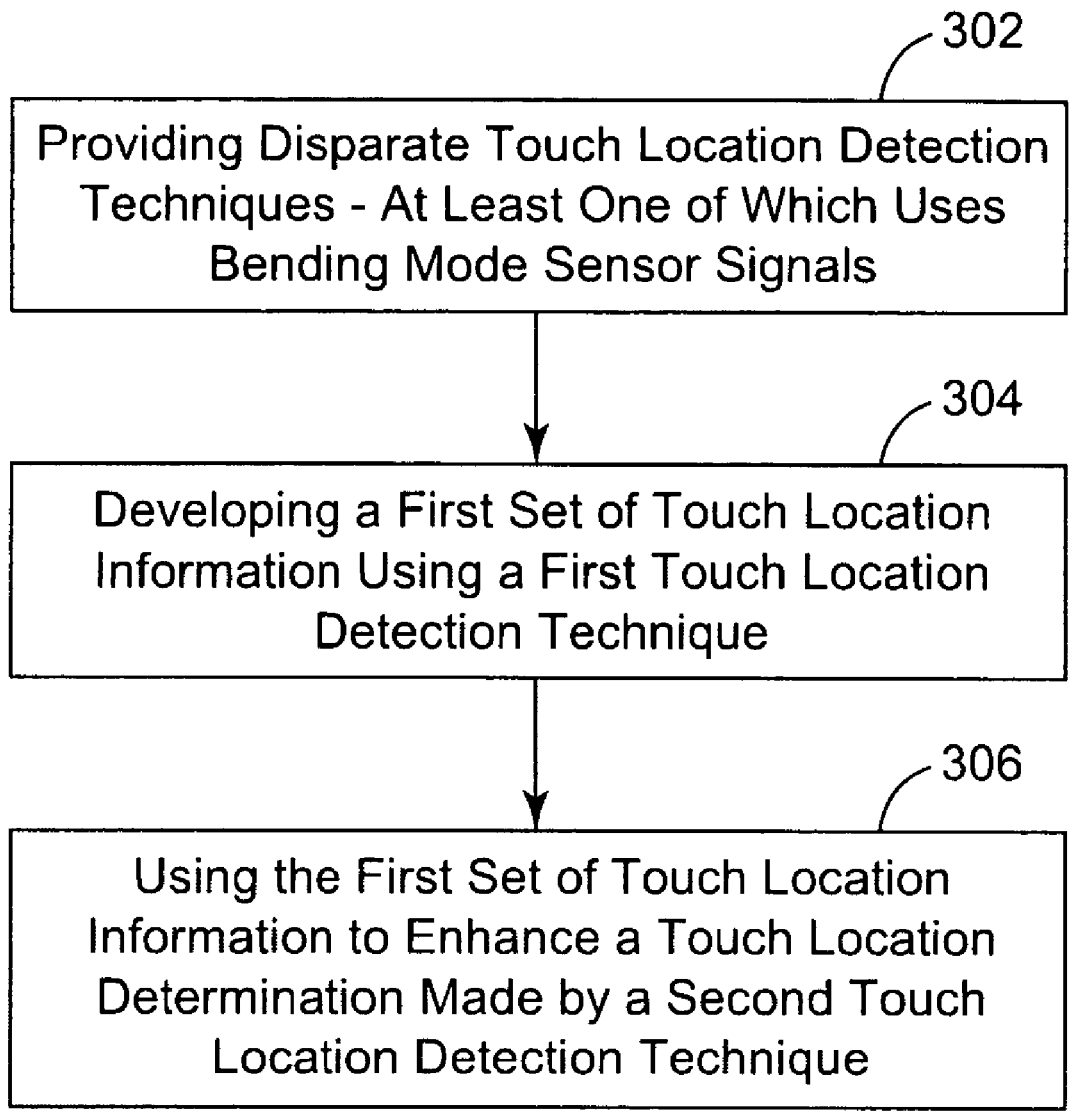

The flowchart of FIG. 3 illustrates a method of enhancing touch location information that involves use of bending mode sensor signals and disparate touch location detection techniques in accordance with embodiments of the invention. The methodology illustrated in FIG. 3 involves providing 302 a multiplicity of disparate touch location detection techniques, at least one of which uses bending mode sensor signals. A first set of touch location information is developed 304 using a first touch location detection techniques. The first set of touch location information is used to enhance 306 a touch location determination made by a second touch location detection technique.

Figure 4:
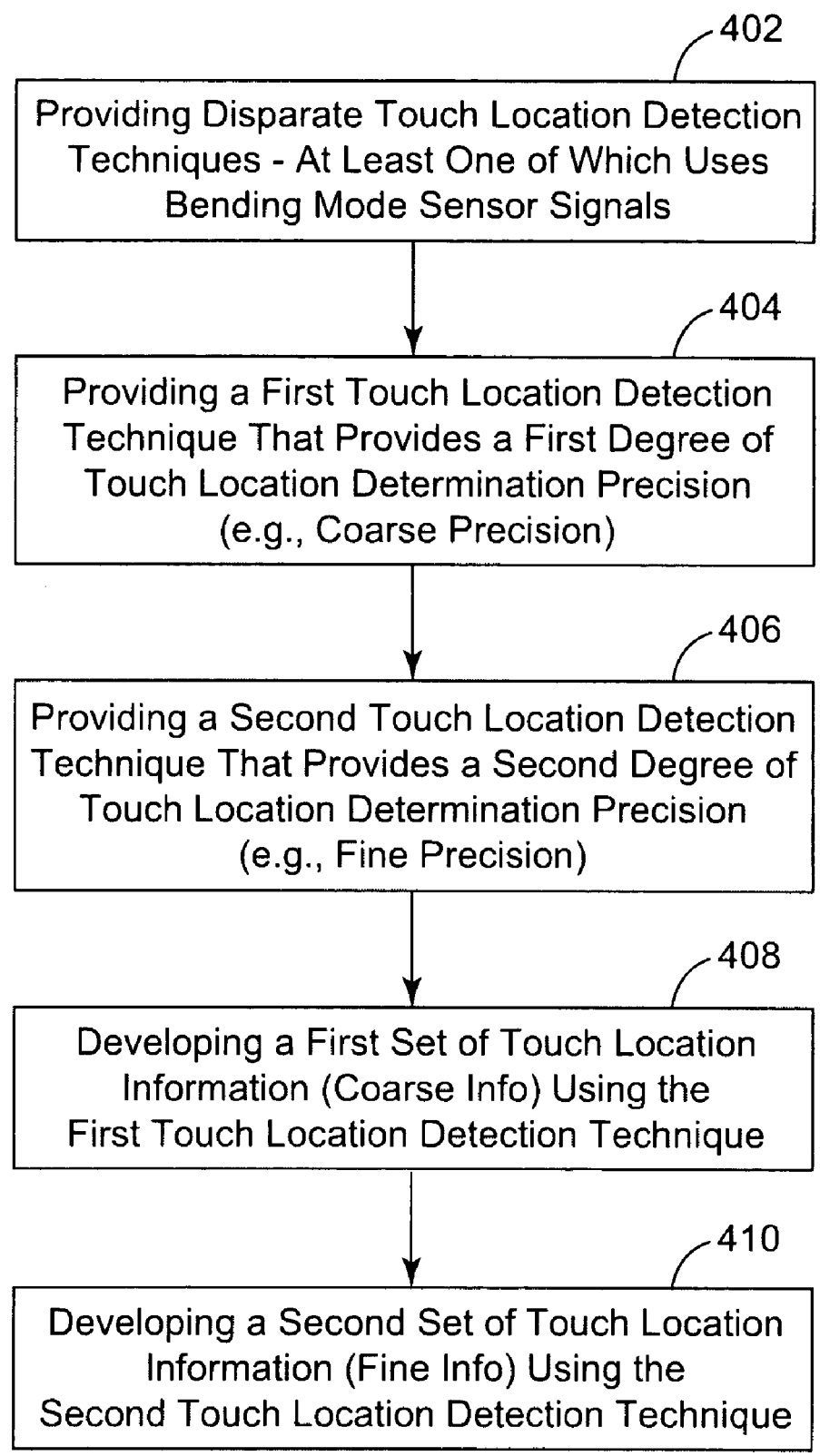

FIG. 4 is a flowchart illustrating another method of developing touch location information using bending mode sensor signals and disparate touch location detection techniques in accordance with embodiments of the invention. The methodology illustrated in FIG. 4 involves providing 402 a multiplicity of disparate touch location detection techniques, at least one of which uses bending mode sensor signals. A first touch location detection technique provides 404 a first degree of precision associated with a touch location determination. A second touch location detection technique may provide 406 a second degree of precision associated with the touch location determination. For example, the first technique may provide for coarse accuracy as to touch location, while the second technique may provide for finer accuracy as to touch location.

A first set of touch location information is developed 408 using the first touch location detection technique. A second set of touch location information is developed 410 using the second touch location detection technique. For example, the first technique may be used to estimate a region of the touch sensitive surface within which the touch occurred. The second technique may be used to provide a more precise estimate of the touch location within the region estimated by the first technique.

Figure 5:
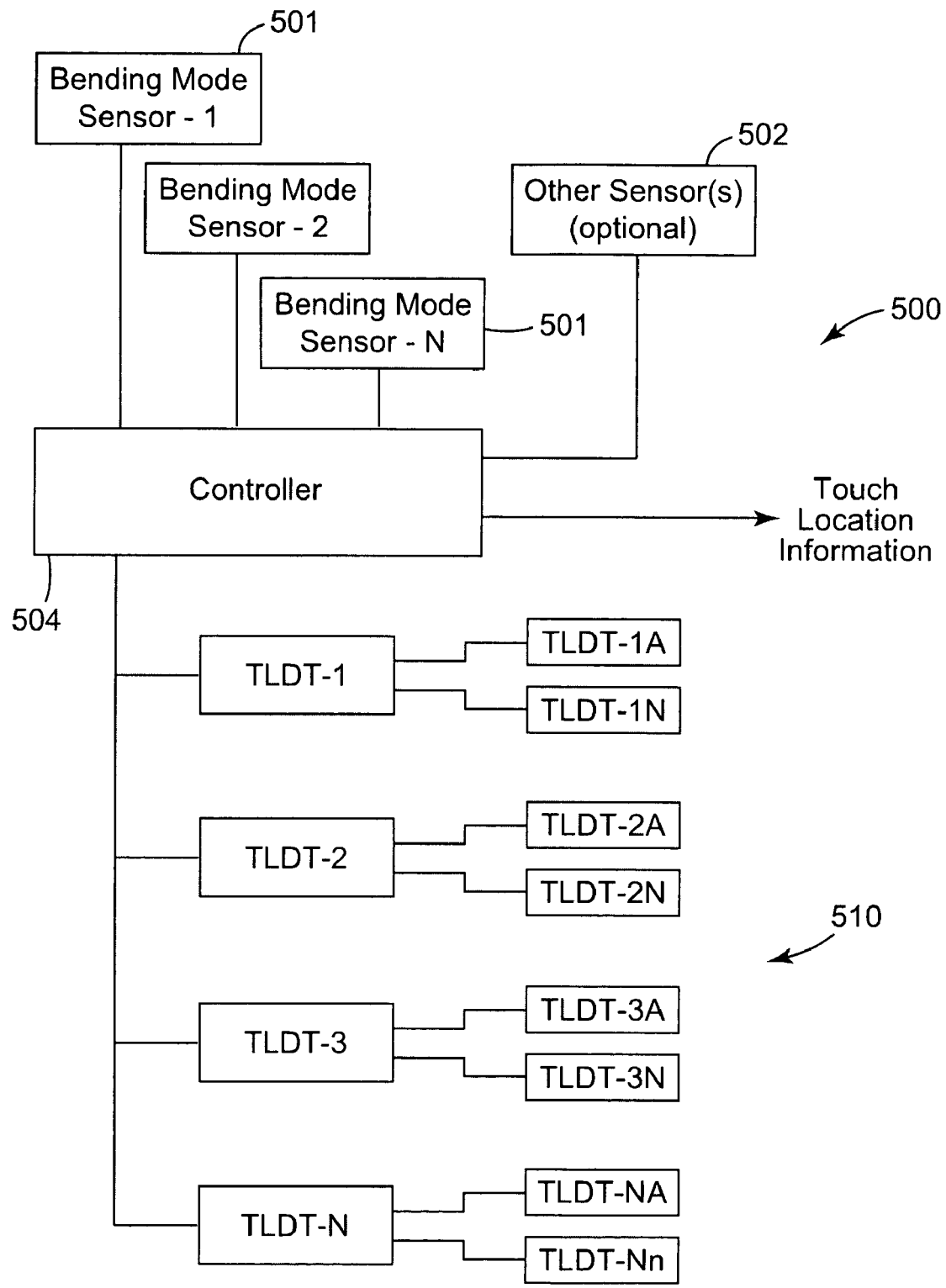
FIG. 5 is a block diagram illustrating a system for implementing disparate touch location detection techniques in accordance with embodiments of the invention.

FIG. 5 is a block diagram of a system 500 for implementing disparate touch location detection techniques in accordance with embodiments of the invention. As is shown in FIG. 5, the system 500 includes a number of bending mode sensors 501 and may optionally include other types of sensors 502 (e.g., capacitive, resistive, force, surface acoustic wave, or optical sensors). The sensors 501, 502 are coupled to a touch sensitive surface (not shown) and to a controller 504. The controller 504 is configured to implement a number of disparate touch location detection techniques (TLDT) 510, which may be stored by, or accessed from, memory coupled to the controller 504. The controller 504 produces touch location information, such as touch position, using the disparate touch location detection techniques 510.

For example, technique TLDT-1 differs from each of techniques TLDT-2 through TLDT-N in terms of functionality or other aspect previously discussed above. In this regard, technique TLDT-1 is considered to be a touch location detection technique dissimilar from techniques TLDT-2 through TLDT-N. By way of further example, a given technique, such as technique TLDT-1, may be implemented in several ways so as to provide differing touch location information, notwithstanding that each technique processes bending mode sensor signals in a similar manner. For example, TLDT-1 may represent a touch location detection technique that, in general terms, performs a frequency analysis of bending mode sensor signals. Technique TLDT-1A may, for example, be implemented to analyze frequencies differing from those associated with technique TLDT-1N. Although each of these techniques share a common approach to processing bending mode sensor signals, they do so by analyzing differing characteristics of such signals, and thus produce differing touch location detection information. As such, technique TLDT-1A is considered to be a touch location detection technique dissimilar from technique TLDT-1N.

Figure 6:
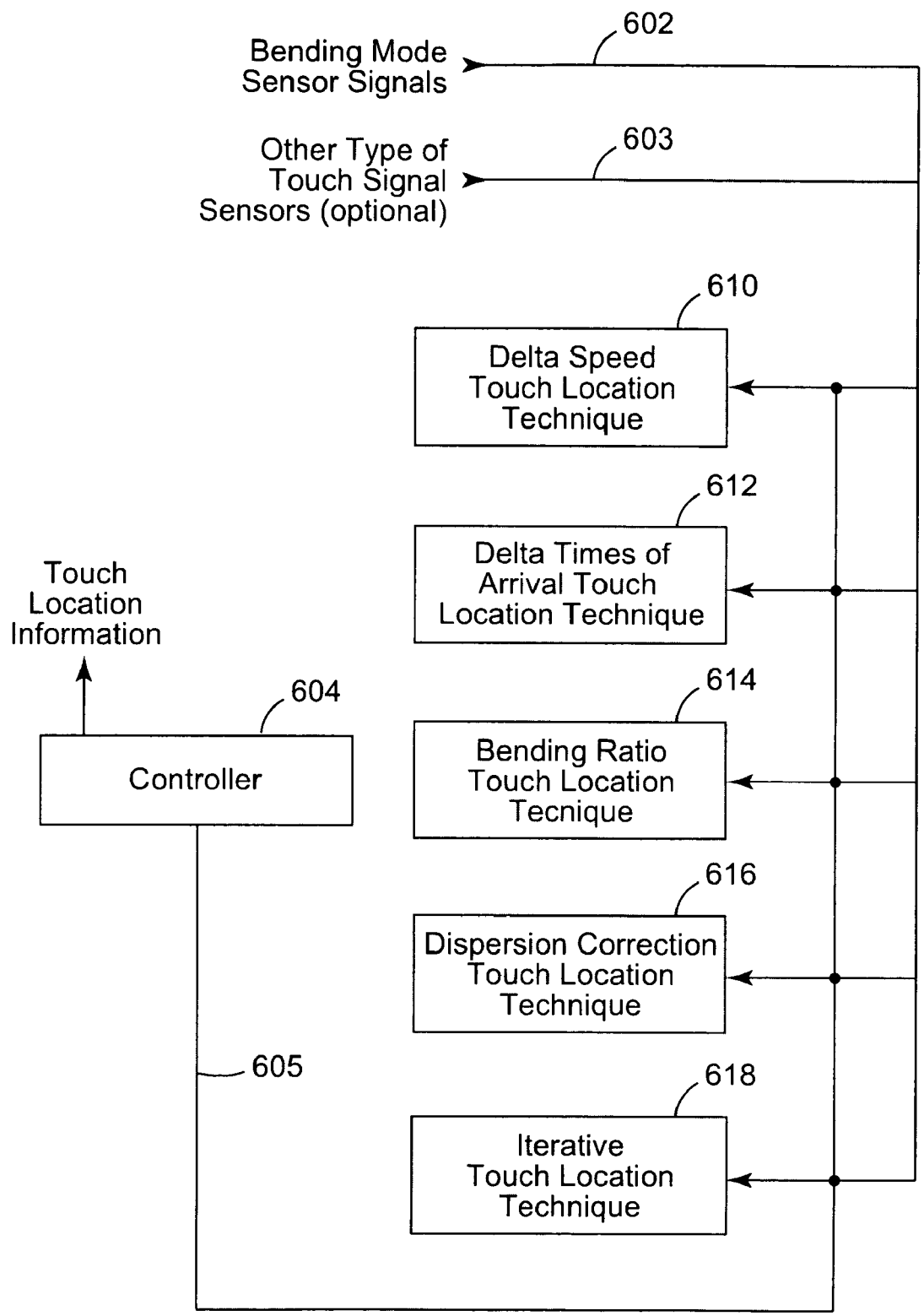
FIG. 6 is a block diagram illustrating another system for implementing disparate touch location detection techniques in accordance with embodiments of the invention.

FIG. 6 is a block diagram of a system 600 for implementing disparate touch location detection techniques in accordance with embodiments of the invention. The system 600 receives bending mode sensor signals 602 and may optionally receive other types of touch sensor signals 603. A controller 604 is configured to implement a number of disparate touch location detection techniques 610-618. The controller 604 produces touch location information using the disparate touch location detection techniques 610-618. In one approach, the controller 604 generates control signals 605 that can enable and disable selected ones of the disparate touch location detection techniques 610-618. According to this embodiment depicted in FIG. 6, the disparate touch location detection techniques includes a delta speed touch location technique 610, a delta times of arrival touch location technique 612, a bending ratio touch location technique 614, a dispersion correction touch location technique 616, and an iterative touch location technique 618. Each of these touch location techniques 610-618 will now be described in greater detail.

A delta speed touch location technique 610 refers to a technique that exploits the phenomena of vibration wave packet dispersion to determine the location of a touch to a touch substrate. A delta speed touch location technique 610 approach uses vibration wave packet dispersion itself to perform distance measurements from which a touch location may be computed. According to one delta speed touch location technique 610, a dispersive vibration wave packet caused by a touch to a touch sensitive substrate is sensed at each bending mode sensor. Content of the wave packet containing a specified frequency or frequencies is detected at each sensor. A relative time delay in arrival of wave packet content associated with the specified frequency or frequencies is calculated at each sensor. A distance between each sensor and the touch event is calculated using the relative time delays. The location of the touch may then be determined using the calculated distances.

In this regard, a delta speed touch location technique 610 may be implemented to measure touch position using only the differences in wave dispersion to calculate time and distance of wave travel. Different frequencies or frequency bands of a vibration wave packet in a dispersive medium can be separated by digital or analog filtering, and the arrival time of each specific frequency or frequency band can be separately determined.

According to another approach, a sensed vibration wave packet resulting from a touch event can be cross-correlated with baseline waveforms that have been generated by touches at various known locations during a calibration process. This cross-correlation process reveals the best match with a particular waveform that emanated from a known location. Since the origin of calibration waveforms is known, the distance of the touch event can be determined based on the best match of separation times of the energy at various frequencies contained. Additional details of this and other delta speed touch location techniques that can be adapted for use with methods and devices of the present invention are described in commonly owned U.S. Ser. No. 11/025,389 filed Dec. 29, 2004 and entitled "Touch Location Determinations Using Vibration Wave Packet Dispersion" and in U.S. Pat. No. 5,635,643, which are hereby incorporated herein by reference.

With continued reference to FIG. 6, a delta times of arrival touch location technique 612 involves touch location determination based on time of arrival of first energy at each bending mode sensor. For example, the time of arrival at each sensor may be determined when energy at each sensor exceeds a pre-set threshold The difference in arrival time of above-threshold energy may be used to calculate a location of an initial touch, such as a tap. This technique 612 is not effective in measuring position of a moving continuous touch, such as a drag. However, a delta times of arrival technique can measure touch with much simpler, and perhaps lower power, processing than other more robust techniques. Such other technique may be used to calculate a finer (more accurate) touch location and/or to calculate position during a drag operation. Useful delta times of arrival techniques are further described in U.S. Pat. No. 5,691,959 and WO 01/48684, which are hereby incorporated herein by reference.

Figure 7:
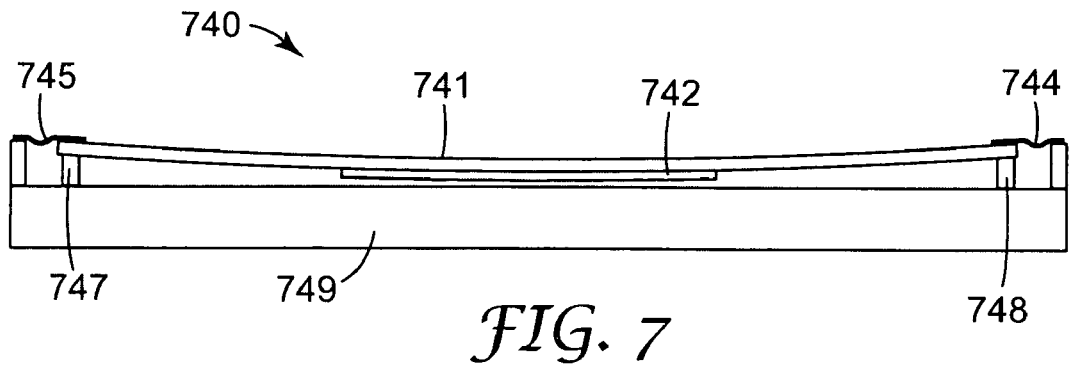
FIGS. 7-9 are diagrams illustrating a cross section of a touch panel system having one or more bending mode sensors for implementing touch location detection by use of disparate touch location detection techniques in accordance with embodiments of the invention.

A bending ratio touch location technique 614 shown in FIG. 6 uses plate bending in combination with simple ratio of magnitudes measurements and calculations to measure touch location. FIG. 7 shows a system 740 with an overlay 741 and sensors 742 on each edge that measure long-wavelength bending of overlay 741. Sensors 742 may extend along the full length of each edge, or a portion of the edge length. Panel 741 is attached to foundation 749 at the corners by supports 747 and 748, which constrain panel 741 vertically. Overlay 741 is constrained from moving in the lateral direction (e.g., in the plane of overlay 741) by edges 744 and 745, attached to foundation 749.

The fundamental half-wave frequency of oscillation of a typical glass touch sensor (in the bending mode shown in FIG. 7) is in the range of 50 Hz to 1K Hz, depending on glass thickness, edge length, and suspension characteristics. Finger touches will have maximum energy at frequencies of 5 Hz to 1K Hz, so detecting touch by measuring at and near the half-wave bending mode frequency yields good signal levels. Measuring signals in this frequency range will reduce the hysteresis effects and non-linearities in components 744, 745, 747, and 748 that suspend panel 741, relative to near-static (0 to 10 Hz) measurements.

With continued reference to FIG. 6, a dispersion correction touch location technique 616 may be used to develop touch location information using bending mode signals. When the propagation medium is a dispersive medium, the vibration wave packet, which is composed of multiple frequencies, becomes spread out and attenuated as it propagates, making interpretation of the signal difficult. As such, it has been proposed to convert the received signals so they can be interpreted as if they were propagated in a non-dispersive medium. Exemplary techniques for addressing vibration wave packet dispersion and producing representative signals corrected for such dispersion are disclosed in International Publications WO 2003/005292 and WO 01/48684, and in U.S. Pat. No. 6,871,149, which are incorporated herein by reference.

According to one approach that operates to correct for vibration wave packet dispersion, for example, a first bending mode sensor mounted on a structure capable of supporting bending waves measures a first measured bending wave signal. A second bending mode sensor is mounted on the structure to determine a second measured bending wave signal. The second measured bending wave signal is measured simultaneously with the first measured bending wave signal. A dispersion corrected function of the two measured bending wave signals is calculated, which may be a dispersion corrected correlation function, a dispersion corrected convolution function, a dispersion corrected coherence function or other phase equivalent function. The measured bending wave signals are processed to calculate information relating to the contact by applying the dispersion corrected function. Details concerning this approach are disclosed in previously incorporated International Publications WO 2003/005292 and WO 01/48684, and in U.S. Pat. No. 6,871,149.

Figure 8:
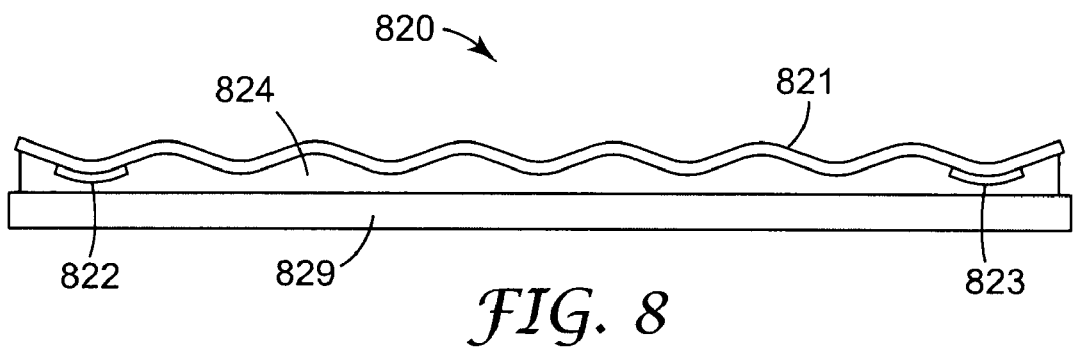

For example, FIG. 8 shows an overlay 821 with bending mode piezoelectric transducer sensors 822 and 823 that measure vibration of the overlay 821, typically at audio frequencies. Touch position may be calculated from the frequency-corrected time of flight of acoustic waves. Compliant suspension 824 may also act as a gasket, and may dampen acoustic signals at the edge of overlay 821. In a further example, a time domain technique, whether or not dispersion correction is employed, may be used to produce initial positional information, and a technique that operates on phase differences may be used to refine the initial positional information produced by the time domain technique.

An iterative touch location technique 618, also shown in FIG. 6, provides for a number of enhanced capabilities. For example, an approximate touch location acquired using a simple computation can be used to inform a more accurate touch location analysis via an iterative process. The approximate or intermediate touch locations can be used to iteratively adjust the sensor signals such that the accuracy of the simple computation can be increased.

Other touch location methods determine the touch location to an accuracy that is inherent in the touch location technique used. An iterative touch location technique 618 provides the capability of iterating towards an exact reconstruction of the source waveforms. Thus, use of such an iterative technique allows the touch location to be determined to a desired or required level of accuracy.

By way of example, touch location signals are generated in response to vibrations created by a touch on a touch plate such as by the processes described above. An approximate touch location of the touch is determined. The approximate touch location may be an arbitrarily selected location, may be based on the generated signals, or may be approximated by other methods. In one scenario, a first touch location technique may be used to approximate the touch location and a second touch location technique may be used to more accurately determine the touch location through the iterative process.

The generated signals are adjusted based on the approximate touch location. The touch location is calculated based on the adjusted signals. The iteration may continue by using the newly determined intermediate touch location to again adjust the signals, recalculating the touch location for any number of iterations. The iterative process may be repeated for multiple cycles to achieve a desired or required touch location accuracy. Upon completion of the requisite number of cycles or upon achieving the desired accuracy, the touch location algorithm ends, returning the last touch location determined by the iterative process. Examples of iterative touch location techniques 618 are described in commonly owned U.S. Ser. No. 11/032,572 filed Jan. 10, 2005 and entitled "Iterative Method for Determining Touch Location," which is incorporated herein by reference.

The following examples illustrate use of multiple disparate touch location techniques to generate touch location information in accordance with embodiments of the present invention. According to one approach, low frequency measurements of panel bending and bend ratio analysis (e.g., a bending ratio touch location technique 614) may be combined with audio frequency dispersion correction measurement and frequency domain analysis (e.g., a dispersion correction touch location technique 616) to achieve complimentary coarse and fine measurement of touch position.

Figure 9:
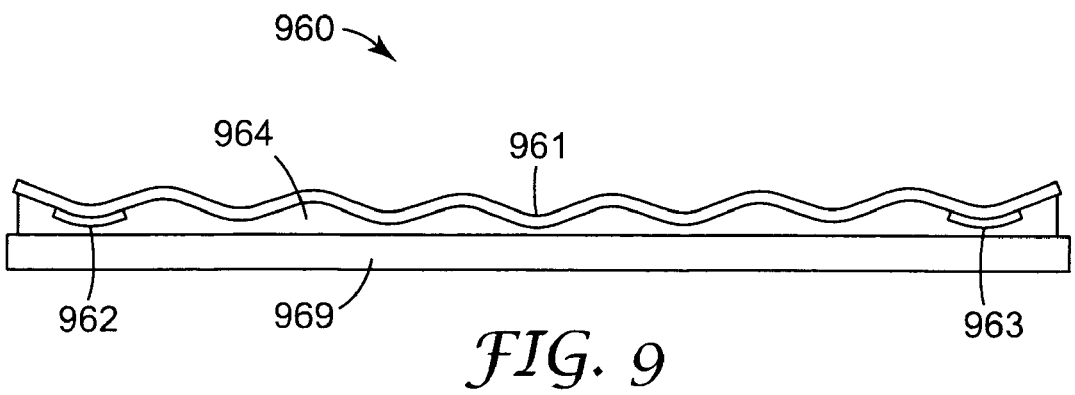

FIG. 9, for example, shows system 960 with overlay 961 and sensors 962 and 963 at each corner. Sensors 962 and 963 measure bending of overlay 961. Sensors 962 and 963 are preferably the same sensors that measure audio frequency vibrations when using a dispersion correction touch location technique 616 in combination with a bending ratio touch location technique 614. Compliant suspension 964 is a strip around the periphery of panel 961. It is preferable that suspension 964 also serve as a gasket for the touch system, and its damping characteristics must accommodate audio frequency requirements of the particular dispersion correction touch location technique 616 and the low frequency plate bending requirements of the particular bending ratio touch location technique 614. The suspension 964 may contact panel 961 on the top surface, bottom surface as shown, or on both surfaces.

As was previously discussed, the fundamental half-wave bending mode frequency of oscillation of a typical glass touch sensor is in the range of 50 Hz to 1K Hz, and finger touches will have maximum energy at frequencies of 5 Hz to 1K Hz. As such, detecting touch by measuring at and near the half-wave bending mode frequency yields good signal levels. As was also discussed, measuring signals in this low frequency bending mode range (50 Hz to 1K Hz) will reduce the hysteresis effects and non-linearities in the spring constant of suspension 64, relative to near-static (0 to 10 Hz) measurements. The bending system shown in FIG. 9 is also relatively immune to large-area "noise" forces such as airborne acoustic waves. But, resolution and accuracy may be limited by non-measured (error) forces that are transferred between panel 961 and foundation 969 through suspension 964. These include bending forces due to foundation flexure and suspension 964 non-uniformities.

Certain touch location detection techniques are better suited for determining coarse location of a touch on a touch sensitive substrate, while other s are better suited for determining fine location of the touch on the touch sensitive substrate. The following illustrative methodology involves determining a coarse position of a touch using one of several techniques, and further involves determining a fine position of the touch using one of several other techniques.

Step A—Finding a Coarse Touch Position by One of Several Methods:
1. Measure relative delta times of arrival (e.g., technique 612) of time-based waveforms. For example, measure the (first) time that energy at each sensor goes above a threshold. The difference in arrival time of above-threshold energy may be used to calculate a coarse position. This coarse approach involves simpler calculations than a dispersion correction touch location technique 616, for example, and may be implemented in less time, with less processing power.
2. The amount of dispersion of received waves (e.g., delay in receiving 3 KHz energy vs. receiving 15 KHz energy) can be used to calculate time of propagation of waves, since dispersion is proportional to time (e.g., delta speed touch location technique 610). A coarse position is determined using simple measurements and calculations of this dispersion difference, then a fine position is derived by a method outlined among the "fine position" options below.
3. Static/low frequency plate-bending signals may be used to generate a coarse touch position by methods described above with respect to a bending ratio touch location technique 616. The panel, panel suspension, and sensors used to measure Lamb wave acoustic signals (e.g., dispersion correction touch location technique 616) may also be used to measure low frequency plate bending signals. This allows a single set of sensors to measure two types of signals (e.g., bend ratio and dispersion correction which both use bending waves in separate frequency ranges, and with different distance measuring criteria). The different signal types (and their different calculation techniques) may be combined to achieve better results than is possible with either method alone.
4. An iterative touch location technique 618 may be used to generate a coarse position, as previously discussed. This method uses an iterative approach with multiple, relatively simple calculations in the frequency domain to locate a touch position from (passive) acoustic data in a panel, such as that used for a dispersion correction touch location technique 616.
    a. Multiple passes of this algorithm can be used to calculate both the coarse and the fine accuracy required to locate a touch, or
    b. One (or more) pass of this algorithm may be used to calculate coarse position from acoustic data, then dispersion correction algorithms may be used to calculate a fine (higher accuracy) position, using the same acoustic data.
    c. Simplified dispersion correction algorithms (lower resolution fast Fourier Transfers or FFTs) may be used on measured acoustic data to calculate a coarse position, then one (or more) pass of this iterative algorithm may be used to calculate a fine position from the same acoustic data.

Step B—Refine to a More Accurate Fine Position by One of Several Methods.
1. A frequency domain based iterative touch location technique 618 may be used to refine a coarse position derived from time domain techniques 1, 2, or 3 above, or frequency domain based technique 4 above into one with higher accuracy.
2. Touch detection by simpler time based measurements of approximate location (from process 1, 2, or 3 above) may trigger known FFT algorithms (e.g., iterative or dispersion correction) that will calculate a more accurate position. As touch location moves during a drag/write operation, delta times of arrival and delta speed touch location techniques 612, 610 may lose accuracy due to lack of signal magnitude, lack of change in signal, and interference from reflections; so algorithms such as dispersion correction 616 or perhaps iterative 618 may be used to track the location during drag.
3. Time based correlation—given an approximate touch location:
    a. The amount of dispersion (D) at each sensor is calculated, based on approximate position.
    b. A template of $T_D(t)$ can be generated for each sensor corresponding to the amount of dispersion.
    c. The dispersion template $T_D(t)$ may then be correlated with the received wave.
    d. Maximum positive correlation confirms that the dispersion (and thus distance to the touch point) is correct for each corner sensor.
    e. Less than maximum correlation shows that further error correction is required.

In some cases, the coarse position yielding touch coordinates accurate to 5% to 20%, may be sufficient, for example an application may start with a menu of four to eight widely spaced buttons on a display, and +/−20% accuracy may be sufficient to discriminate which button is touched. Subsequent touch operations may require additional accuracy, so a second touch location technique may be employed.

By way of further example, a hand rejection (e.g., false touch) methodology may be implemented using disparate touch location detection techniques. In one illustrative example, a dispersion correction technique 616 (e.g., dispersion-corrected acoustic measurement) and a bending ratio technique 614 (e.g., static/low frequency plate-bending measurement) may be used in combination to implement a hand rejection methodology.

A touch panel used for writing input may have two touch points; one is the hand resting on the panel, and the other is a stylus tip used for writing. It is advantageous to know the location of the hand while measuring stylus position with dispersion correction methods. The hand generates acoustic energy and it also absorbs and reflects some of the energy generated by the stylus during writing. This is especially true for heavy hand pressure. Stylus movement and location are most efficiently located by measuring higher acoustic frequencies. Hand position may be measured separately as a combination of (generally lower frequency) acoustic signals when the hand is moved, plus very low frequency bend ratio measurements when the hand is resting on the tablet surface.

Compensation for hand-generated signals and for the hand's effect on stylus signals may increase accuracy of stylus position measurements.
1. While writing with the stylus, reflections and acoustic noise from the hand may be ignored or actively subtracted out by (some very complex) calculations.
2. If the hand is detected between the stylus and one corner, iterative or dispersion corrected signals received at that corner may be ignored (all 4 corner signals are generally not required for position calculation) or modified.

A wake on touch or touch confirmation methodology may be implemented using bending mode sensors and a multiplicity of disparate touch location detection techniques. A wake on touch methodology, for example, involves sensing bending wave vibrations imparted to a touch substrate and determining whether such wave vibrations resulted from intended or unintended touches to the touch substrate. Some touches to the touch substrate can also be distinguished from other touches made using different touch implements or different touch forces so that only certain intended touches are detected as wake-on touch signals. Details of various wake-on-touch methodologies are disclosed in U.S. patent application Ser. No. 10/683,342, filed Oct. 10, 2003, which is incorporated herein by reference. Details of various methodologies directed to lift-off detection and improved sensitivity to light touches are described in commonly assigned U.S. Ser. No. 10/750,291 which is incorporated herein by reference.

By way of further example, one low power dissipation technique may be used to wake (power up) the main touch measurement system, and another (higher power technique) may be used to measure touch location. Each of these disparate technique preferably use bending mode sensors. Time-based technique, such as delta times of arrival 612, delta speed 610, and bending ratio 614 for example, may require less processing power than FFT based methods such as dispersion correction 616, so a time-based method may be used to wake a touch detection process.

Figure 10:
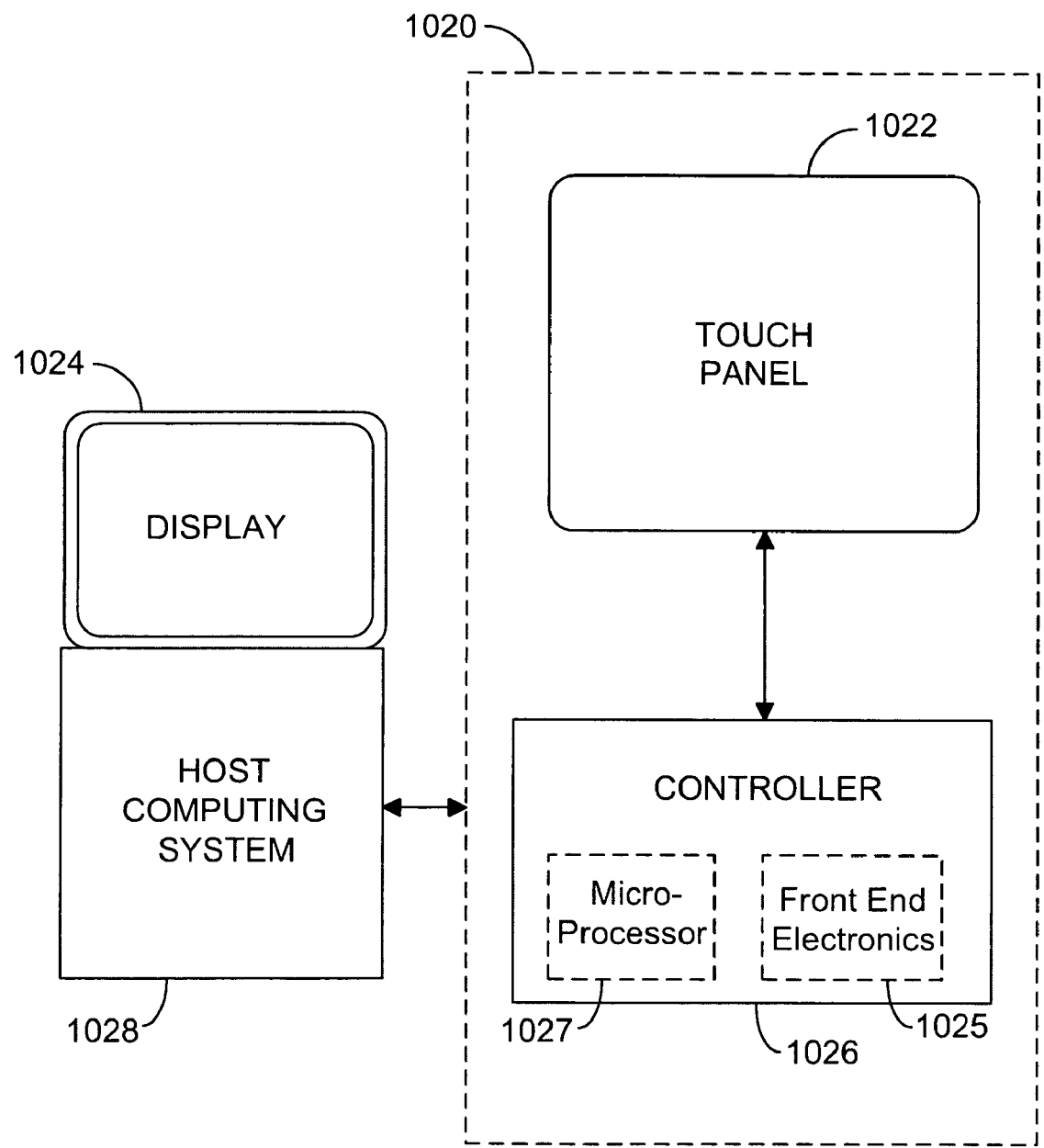
FIG. 10 is a block diagram of a touch screen system suitable for implementing enhanced touch location determination in accordance with embodiments of the invention.

Turning now to FIG. 10, there is shown an embodiment of a touch screen system that is suitable for implementing enhanced touch location determination in accordance with an embodiment of the present invention. The touch system 1020 shown in FIG. 10 includes a touch panel 1022, which is communicatively coupled to a controller 1026. The controller 1026 includes at least electronic circuitry 1025 (e.g., front end electronics) that applies signals to the touch panel 1022, measures touch signals or touch signal changes, and implements two or more disparate touch location detection techniques to generate touch location information. In more robust configurations, the controller 1026 can further include a microprocessor 1027 in addition to front end electronics 1025. In a typical deployment configuration, the touch panel 1022 is used in combination with a display 1024 of a host computing system 1028 to provide for visual and tactile interaction between a user and the host computing system 1028.

It is understood that the touch panel 1022 can be implemented as a device separate from, but operative with, a display 1024 of the host computing system 1028. Alternatively, the touch panel 1022 can be implemented as part of a unitary system that includes a display device, such as a plasma, LCD, or other type of display technology amenable to incorporation of the touch panel 1022. It is further understood that utility is found in a system defined to include only the sensor 1022 and controller 1026 which, together, can implement touch detection methodologies of the present invention.

In the illustrative configuration shown in FIG. 10, communication between the touch panel 1022 and the host computing system 1028 is effected via the controller 1026. It is noted that one or more controllers 1026 can be communicatively coupled to one or more touch panels 1022 and the host computing system 1028. The controller 1026 is typically configured to execute firmware/software that provides for detection of touches applied to the touch panel 1022, including error correction for movement of the touch panel in accordance with the principles of the present invention. It is understood that the functions and routines executed by the controller 1026 can alternatively be effected by a processor or controller of the host computing system 1028.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A touch sensing method, comprising:
   providing a plurality of bending mode sensors coupled to a touch sensitive surface;
   providing a plurality of disparate touch location detection techniques; and
   developing touch location information using the disparate touch location detection techniques;
   wherein the disparate touch location detection techniques comprise a first and second touch location detection technique, at least one of which uses signals generated by the bending mode sensors; and
   wherein, for a given touch on the touch sensitive surface, the developing comprises determining a coarse location for the touch using the first touch location technique, and using the determined coarse location to enhance a touch location determination made by the second touch location technique to provide a fine location for the touch, the fine location being more accurate than the first and second touch location techniques alone.

2. The method of claim 1, wherein at least two of the plurality of disparate touch location detection techniques use signals generated by the bending mode sensors.

3. The method of claim 2, wherein the at least two of the plurality of disparate touch location detection techniques that use signals generated by the bending mode sensors differ in terms of frequency response.

4. The method of claim 1, wherein at least some of the plurality of disparate touch location detection techniques are capable of independently detecting a touch location.

5. The method of claim 1, wherein providing the plurality of disparate touch location detection techniques comprises:
   providing a first touch location detection technique that determines x and y coordinates of a touch location relative to the touch sensitive surface; and
   providing a second touch location detection technique that determines a z coordinate relative to the touch sensitive surface.

6. The method of claim 1, wherein providing the plurality of disparate touch location detection techniques comprises providing at least one touch location detection technique that provides dispersion correction to the signals generated by at least one bending mode sensor of the plurality of bending mode sensors.

7. The method of claim 1, wherein developing the touch location information comprises determining displacement of the touch sensitive surface using at least one of the plurality of touch location detection techniques.

8. The method of claim 7, wherein developing the touch location information comprises determining a time of flight of bending waves generated by a touch on the touch sensitive surface using at least one of the plurality of touch location detection techniques.

9. The method of claim 7, wherein developing the touch location information comprises correcting for dispersion of the signals generated by at least one bending mode sensor of the plurality of bending mode sensors.

10. The method of claim 1, wherein developing the touch location information comprises:
    confirming a touch on the touch sensitive surface using one of the plurality of touch detection techniques; and
    determining a location of the touch on the touch sensitive surface using another of the plurality of touch detection techniques.

11. A touch sensitive device, comprising:
a plurality of touch sensors configured to detect bending of a touch sensitive surface resulting from a touch to the touch sensitive surface; and
processing circuitry configured to implement a plurality of disparate touch location detection techniques, the touch location detection techniques including a first and second touch location detection technique at least one of which uses signals generated by the plurality of touch sensors, the processing circuit also being configured to develop touch location information about the touch using the disparate touch location detection techniques in such a way that a coarse location for the touch is determined using the first touch location technique, and the determined coarse location is used to enhance a touch location determination made by the second touch location technique to provide a fine location for the touch, the fine location being more accurate than the first and second touch location techniques alone.

12. The device of claim 11, wherein at least one of the plurality of touch sensors is sensitive to a first frequency range and at least one other of the plurality of touch sensors is sensitive to a second frequency range that differs from the first frequency range.

13. The device of claim 11, wherein at least one of the plurality of disparate touch location detection techniques is sensitive to a first frequency range and at least one other of the plurality of disparate touch location detection techniques is sensitive to a second frequency range that differs from the first frequency range.

14. The device of claim 11, wherein the plurality of touch sensors are sensitive to the same frequency range.

15. The device of claim 11, wherein at least some of the plurality of disparate touch location detection techniques are capable of independently detecting a touch location.

16. The device of claim 11, wherein the touch location information comprises a z coordinate of the touch relative to the touch sensitive surface.

17. The device of claim 11, wherein the touch location information comprises a force of the touch on the touch sensitive surface.

18. The device of claim 11, wherein at least some of the plurality of disparate touch location detection techniques use bending waves sensed by some of the plurality of touch sensors to develop the touch location information.

19. The device of claim 11, wherein at least some of the plurality of disparate touch location detection techniques use displacement of the touch sensitive surface sensed by at least one of the plurality of touch sensors to develop the touch location information.

20. The device of claim 11, wherein the processor is configured to confirm a touch on the touch sensitive surface using one of the plurality of touch detection techniques and to determine a location of the touch on the touch sensitive surface using another of the plurality of touch detection techniques.

* * * * *

UNITED STATES PATENT AND TRADEMARK OFFICE
CERTIFICATE OF CORRECTION

PATENT NO. : 7,683,890 B2  Page 1 of 1
APPLICATION NO. : 11/116463
DATED : March 23, 2010
INVENTOR(S) : Bernard Geaghan It is certified that error appears in the above-identified patent and that said Letters Patent is hereby corrected as shown below:

Drawings

In the Drawings; Sheet 5 of 7, Box 614; line 3, delete "Tecnique" and insert -- Technique -- therefor.

Column 2

Line 60; delete "techniques." and insert -- technique. -- therefor.

Column 8

Line 36; delete "techniques." and insert -- technique. -- therefor.

Column 10

Line 21; after "2004" insert -- under Attorney Docket No. 60084US002 -- therefor.
Line 30; after "threshold" insert -- . -- therefor.

Column 12

Line 13; after "2005" insert -- under Attorney Docket No. 60083US002 -- therefor.

Column 13

Line 52; delete "fast" and insert -- Fast -- therefor.

Column 15

Line 14; delete "technique" and insert -- techniques -- therefor.

Signed and Sealed this

Fifth Day of October, 2010

David J. Kappos
*Director of the United States Patent and Trademark Office*